(12) United States Patent
Mantere et al.

(10) Patent No.: US 8,421,291 B2
(45) Date of Patent: Apr. 16, 2013

(54) PERMANENT MAGNET ELECTRIC MACHINE AND PERMANENT MAGNET WITH LINEARLY INCREASING AIR GAP FOR AN ELECTRIC MACHINE

(75) Inventors: Juhani Mantere, Tuusula (FI); Tommi Ryyppö, Espoo (FI); Aron Szucs, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 13/235,195

(22) Filed: Sep. 16, 2011

(65) Prior Publication Data

US 2012/0001508 A1 Jan. 5, 2012

Related U.S. Application Data

(63) Continuation of application No. PCT/FI2010/000022, filed on Mar. 25, 2010.

(30) Foreign Application Priority Data

Mar. 25, 2009 (FI) .................................... 20090115

(51) Int. Cl.
*H02K 21/12* (2006.01)
(52) U.S. Cl.
USPC ............ 310/154.46; 310/156.01; 310/156.12; 310/156.18
(58) Field of Classification Search ............ 310/156.01, 310/156.09, 156.11–156.13, 156.18, 156.19, 310/21–25, 156.31, 156.38, 156.47, 156.58, 310/156.72; *H02K 21/12*
See application file for complete search history.

(56) References Cited

U.S. PATENT DOCUMENTS

| 5,397,951 | A  | * | 3/1995  | Uchida et al. ............ 310/156.21 |
| 6,441,522 | B1 | * | 8/2002  | Scott ......................... 310/156.23 |
| 6,489,690 | B1 | * | 12/2002 | Hatsugai et al. ............. 290/1 A |
| 6,603,232 | B2 | * | 8/2003  | Van Dine et al. ........ 310/156.01 |

(Continued)

FOREIGN PATENT DOCUMENTS

EP  0 569 594 A1  11/1993
JP  1-234038 A    9/1989

(Continued)

OTHER PUBLICATIONS

International Search Report (PCT/ISA/210) issued on Jun. 15, 2010, by Finland Patent Office as the International Searching Authority for International Application No. PCT/FI2010/000022.
Written Opinion (PCT/ISA/237) issued on Jun. 15, 2010, by Finland Patent Office as the International Searching Authority for International Application No. PCT/FI2010/000022.

*Primary Examiner* — Tran Nguyen
*Assistant Examiner* — Terrance Kenerly
(74) *Attorney, Agent, or Firm* — Buchanan Ingersoll & Rooney PC

(57) ABSTRACT

The disclosure relates to an electric machine with a permanent magnet rotor, where permanent magnets have been fitted on an outer surface of a cylindrical rotor, and relates to a permanent magnet. The permanent magnets forming the electric machine's rotor pole are shaped so that the electric machine's air gap is substantially constant in a middle of the pole, and the air gap increases in an essentially straightforward manner when moving towards the edge of the pole. The permanent magnet is of an even thickness in the middle, and becomes thinner towards the edges. This can result in a decrease in the torque ripple and cogging torque of an electric machine.

17 Claims, 4 Drawing Sheets

U.S. PATENT DOCUMENTS

| | | | |
|---|---|---|---|
| 7,676,880 B2* | 3/2010 | Moein et al. | 15/250.3 |
| 7,781,932 B2* | 8/2010 | Jansen | 310/156.08 |
| 8,084,910 B2* | 12/2011 | Silander | 310/156.23 |
| 2004/0124728 A1* | 7/2004 | Yamaguchi et al. | 310/156.25 |
| 2005/0001501 A1* | 1/2005 | Fujii | 310/156.43 |
| 2006/0103251 A1* | 5/2006 | Taniguchi et al. | 310/156.01 |
| 2006/0220483 A1* | 10/2006 | Jones et al. | 310/156.19 |
| 2006/0284507 A1* | 12/2006 | Murakami | 310/156.37 |
| 2008/0054736 A1 | 3/2008 | Miyata et al. | |
| 2008/0185930 A1 | 8/2008 | Ahrens et al. | |

FOREIGN PATENT DOCUMENTS

| | | | |
|---|---|---|---|
| JP | 2000-152535 A | | 5/2000 |
| JP | 2000350393 | * | 12/2000 |
| JP | 2007-236160 A | | 9/2007 |
| JP | 2008-182786 A | | 8/2008 |

* cited by examiner

PERMANENT MAGNET ELECTRIC MACHINE AND PERMANENT MAGNET WITH LINEARLY INCREASING AIR GAP FOR AN ELECTRIC MACHINE

RELATED APPLICATIONS

This application claims priority as a continuation application under 35 U.S.C. §120 to PCT/FI2010/000022, which was filed as an International Application on Mar. 25, 2010, designating the U.S., and which claims priority to Finnish Application FI20090115 filed in Finland on Mar. 25, 2009. The entire contents of these applications are hereby incorporated by reference in their entireties.

FIELD

The disclosure relates to an electric machine and a permanent magnet for an electric machine as well as a method for manufacturing a permanent magnet.

BACKGROUND INFORMATION

Permanent magnets can be used for establishing a magnetic field in electric machinery. In permanent magnet electric machines, permanent magnets are fitted in a rotor that is at an air gap distance from the electric machine's stator. The permanent magnets can be used for establishing a magnetic field, and the magnetic flux of the field goes over the air gap to the stator. The permanent magnets can be fitted either on the rotor's surface, or inside the rotor's magnetically conductive frame. The air gap between the rotor and the stator can be parallel to the electric machine's shaft, or perpendicular to the shaft, in which case the air gap can be radial. In electric machines with a radial air gap, the rotor can be either inside or outside the stator.

The disclosure is related to surface-fitted permanent magnets, and electric machines that have been magnetized with permanent magnets and which have a radial air gap. A permanent magnet can include one or more permanent magnet pieces in a direction of the electric machine's shaft. Each pole of the electric machine has one or more parallel permanent magnet pieces in the circumferential direction of the electric machine. The electric machine can have an external rotor or an internal rotor, and the permanent magnets can be fitted on a rotor surface that is facing towards the stator. The electric machine can function either as a generator or a motor. Moreover, the electric machine can have at least ten poles but the number of poles can be many dozens, up to over a hundred poles. The electric machine's number of slots per pole per phase can be one or two.

In electric machines, it is desirable to establish in the air gap a magnetic flux density that varies as evenly as possible in the electric machine's magnetic pole area. The magnetic flux density is the highest in the middle of the magnetic pole, decreases ideally according to a sinusoidal curve when moving towards the pole's edge, and is zero on the pole edge. If the air gap influx distribution deviates extensively from the pure sinusoidal form, harmonic waves in the distribution can cause torque vibration. In permanent magnet electric machines, in which the number of slots per pole per phase is one or two and which have a large number of poles, idling can create a cogging torque due to the permeance fluctuation caused by the stator tooth. Under load, the current flowing in the stator winding can result in a flux that causes torque ripple. The cogging torque and the torque ripple caused by the current are summed under load. The dimensioning guideline is that during idling, the cogging torque may not exceed 1% of the nominal torque. On the other hand, under nominal load, the torque ripple may not exceed 2% of the nominal torque.

Powerful permanent magnets such as NdFeBo [neodymiumironboron] magnets based on rare earth metals can be used in permanent magnet electric machines. They can provide a sufficient magnetic field, but can be fragile, and it is difficult, time consuming and expensive to process them exactly to the intended shape.

Fastening permanent magnets on the rotor's curved surface involves processing. Either the rotor surface can be processed straight piece by piece, or the lower surface of the permanent magnet can be processed concave. Besides gluing used for the fitting, permanent magnets may also have to be fastened with fastening means between the poles. The fastening means can take up space from the permanent magnet itself in the circumferential direction of the rotor.

Permanent magnet dimensions' impact on the performance of the electric machine can be a complicated problem where several factors affect the outcome, often in a conflicting manner. Therefore, an optimal outcome is the combined effect of many factors.

A permanent magnet electric machine is known from the published patent application JP 01-234038 where permanent magnets, their cross-section being the shape of a hexagon, have been fitted on the rotor surface. The rotor's outer circumference has been processed straight at the poles, in which case the cross-section of the rotor frame is a polygon. The permanent magnets are shaped so that there is a straight middle section on an upper surface of the permanent magnet. The middle section is small in order to achieve a minimal cogging torque.

SUMMARY

An electric machine is disclosed comprising: a stator; a cylindrical permanent magnet rotor having a circumferential surface; a plurality of permanent magnets fitted onto the circumferential surface and opposite the stator; whereby the electric machine's air gap is the distance between a stator circumference and a top surface of the permanent magnet, wherein the permanent magnets form a rotor pole, each permanent magnet being shaped so that an air gap magnitude is essentially constant in the pole's middle area, and the air gap increases in substantially linearly from the pole's middle area towards a pole edge, and the middle area's width in a direction of a rotor tangent is at least half of a width of the magnet.

A permanent magnet for an electric machine is disclosed, the electric machine including a stator and a rotor having an outer circumference, the permanent magnet comprising: an inner surface that can be arranged on the rotor's outer circumference, and an outer surface that is facing towards the electric machine's stator to form an air gap, wherein: the permanent magnet includes edge parts and a middle part, the permanent magnet has an even thickness in the middle part, the permanent magnet's thickness evenly decreases towards the permanent magnet's edge, a difference in the permanent magnet's thickness in the middle part and at the edge equals the air gap, and the middle part's width is equal to or larger than the combined width of the edge parts.

A method is disclosed for decreasing a permanent magnet electric machine's slot harmonics torque, to which machine has been specified a nominal torque, and at least a rotor pole's permanent magnet width, a thickness of the permanent magnet and a size of the electric machine's air gap, the permanent magnet including an outer surface facing towards the machine's air gap, and an inner part facing against a rotor frame, whereby the outer surface's middle part is at an air gap's distance from a stator and edges of the outer surface are beveled so that their distance from the stator exceeds the air gap, wherein the method comprises: forming a number of alternative permanent magnet dimensions by varying at least one permanent magnet dimension from among the following: the permanent magnet's width; the permanent magnet's thickness; the permanent magnet's middle part width; and a bevel depth of the permanent magnet at the edge of the permanent magnet; calculating a cogging torque's torque ripple magnitude for formed dimensions of the permanent magnet; selecting a dimension by which the cogging torque and torque ripple are under a specified value; and manufacturing and installing the permanent magnet according to the selected dimension to the electric machine.

BRIEF DESCRIPTION OF THE DRAWINGS

In the following, the disclosure will be described in detail by referring to the drawings, where.

DETAILED DESCRIPTION

The disclosure relates to a permanent magnet structure and a permanent magnet rotor which can be inexpensive to manufacture and which can meet electric machine specification both during idling and under load. A method is disclosed for making a permanent magnet electric machine which can simultaneously achieve both a specified sinusoidal distribution of the air gap flow, and an inexpensive manufacturing and finishing of permanent magnets. Ensuring the sinusoidality can be particularly important in multipole electric machines where the winding's number of slots per pole and phase is one or two. In these cases, a harmful impact of slot harmonics is emphasized. It can be technically difficult to manufacture a permanent magnet that is purely sinusoidal with regard to its top surface. Instead, it can be relatively easy to process three straight plane surfaces. The number of work stages does not essentially increase, because the surface of the permanent magnet should in any case be finished into its intended form after compression.

To reliably fasten the permanent magnets fitted on the rotor's outer surface, the permanent magnet's lower surface and the outer surface of the rotor core should be compatible. Due to their large size, electric machines with a large number of poles and with a large diameter can be difficult to handle and process so that a straight surface could be achieved in them. On the other hand, permanent magnet material can be fragile and therefore difficult to process in a precise curved shape. According to an exemplary embodiment of the disclosure, a washer can be fitted between the rotor's circumferential surface and the permanent magnet. The lower surface of the washer corresponds to the rotor surface shape, and the upper surface against the permanent magnet is straight.

A method according to an exemplary embodiment of the disclosure takes into account both the magnitude of the slot harmonics torque both during idling and under load, and can minimize its impact so that the electric machine requirements are not exceeded in either situation.

According to an exemplary embodiment, the permanent magnet is fitted with connecting devices, and the connecting lugs of the devices extend over the top surface of the permanent magnets. The arrangement can be simple to implement and does not require processing or additional shaping of the permanent magnet piece. It can be possible to minimize the amount of possibly electrically conductive material in the same air gap area.

Figure 1:
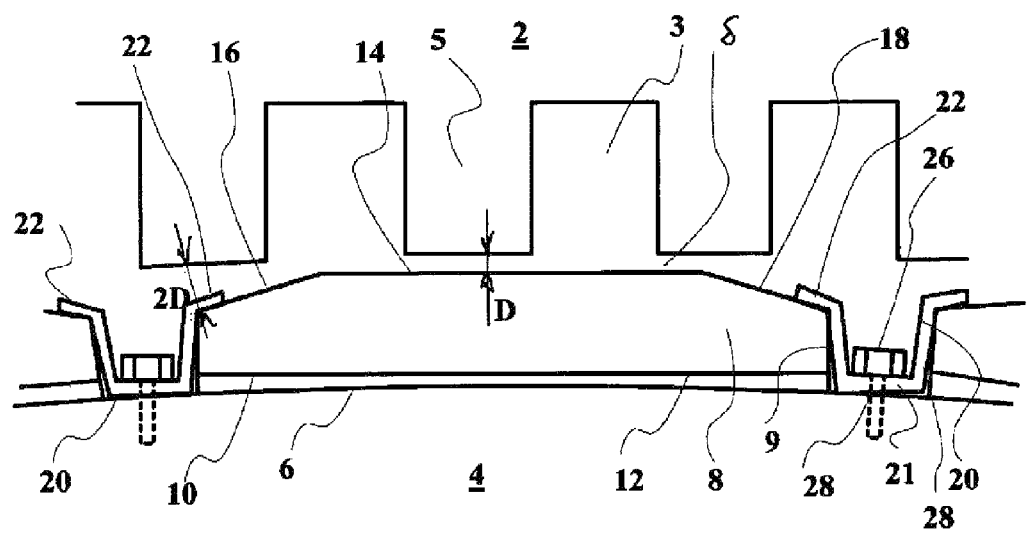
FIG. 1 is a partial illustration of an electric machine according to an exemplary embodiment of the disclosure.

FIG. 1 is a partial illustration of an exemplary embodiment of a permanent magnet synchronous machine where the rotor 4 is inside the stator 2 at the air gap's $\delta$ distance from the stator. The stator is manufactured of magnetically conductive plates, and slots 3 have been formed in it for stator windings (not illustrated). The stator teeth 5 are between the slots. In this case, the number of slots per pole per phase of the electric machine is one, such that a three-phase machine has three slots per pole.

The rotor includes a magnetic frame that has been formed from magnetically conductive sheets, for example, by piling them as a sheet pack which is the length of the rotor. The rotor's magnetic frame has been fastened, directly or via the rotor center, onto the synchronous machine's shaft, which has been fitted with a bearing to the electric machine's frame in a well known manner.

According to the synchronous machine's number of poles, a number of permanent magnets 8 including the rotor's magnetic poles, are fastened onto the outer circumference 6 of the rotor's magnetic frame. In the lengthwise direction of the synchronous machine, there are several separate permanent magnets 8 so that they substantially cover the length of the entire rotor. The permanent magnets 8 include the undersurface 10 which is against the washer 12 fitted on the outer surface of the rotor's magnetic frame. The lower surface of the washer 12 is slightly curved, corresponding to the curvature of the outer circumference 6 of the rotor's magnetic frame. The washer 12 has a straight upper surface, and permanent magnet is against the surface.

The permanent magnet's 8 upper surface against the air gap $\delta$ and the stator includes three parts, the middle part 14 and two side parts 16 and 18. The upper surface's middle part 14 is substantially parallel to the permanent magnet's lower surface 10, such that the permanent magnet is of a substantially even thickness at the middle part 14. At the permanent magnet's middle part 14, the distance between the stator's inner surface and the permanent magnet—that is, the machine's air gap length D—is substantially equal. In this embodiment, only the curvature of the stator's inner surface slightly changes the air gap at the permanent magnet's middle part 14 but its impact is minor in a multipole machine with a large diameter.

The permanent magnet's upper surface's edge parts 16 and 18 are slightly bevelled in the example in FIG. 1 so that the thickness of the permanent magnet at the edge is about a quarter smaller than in the middle part. The distance between the permanent magnet's edge part and the stator's inner surface is 2D, that is, two times the air gap at the permanent magnet. The permanent magnet's middle part length in the circumferential direction of the machine can vary by machine.

Connecting devices 20 can be fitted on both sides of the permanent magnets 8. The devices have connecting lugs 22, extending over the permanent magnets' edge parts 16 and 18. The connecting lugs 22 press the permanent magnets against the rotor surface. The permanent magnets can be glued onto the washer that itself is glued onto the rotor surface. At their middle section 24, the connecting devices are fastened with bolts 26 to the rotor frame. The connecting device can be made of a non-magnetic material, for example, aluminum or steel, or a suitable composite material. The connecting device's 20 middle part is slightly narrower than the space remaining between the permanent magnets. Moreover, the connecting device's edge 28 is slightly slanted in regard to the permanent magnet's 8 vertical edge 9. In this case, a gap remains between the connecting lug and the vertical surface of the permanent magnet's edge, which makes for easier fitting and leaves the edge surface of the permanent magnet free. The connecting device can be slightly flexible. The connecting device 20 and its fastening bolt 26 can be low so that the air gap area will remain free. This can improve the flow of cooling air between the permanent magnets.

Figure 2:
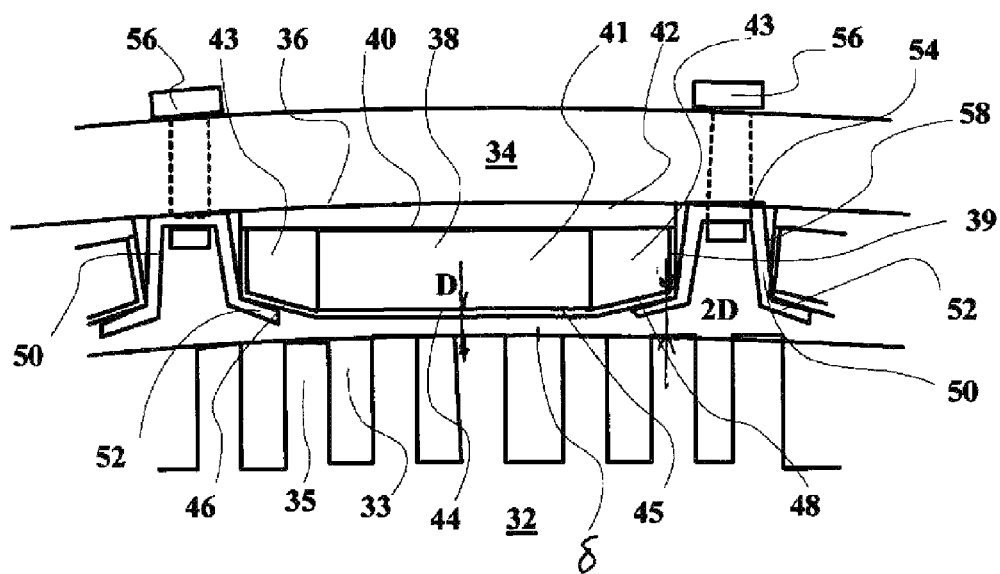
FIG. 2 is a partial illustration of a second electric machine according to an exemplary embodiment of the disclosure.

FIG. 2 illustrates another exemplary embodiment pursuant to the disclosure, with a permanent magnet synchronous machine implemented with an external rotor. The stator is manufactured of magnetically conductive plates, and slots 33 have been formed in it for stator windings (not illustrated). The stator teeth 55 are between the slots. In this case, the number of slots per pole per phase of the electric machine is two, such that a three phase machine has six slots per pole.

The rotor 34 is outside the stator 32, at the air gap's δ distance from the stator. The rotor includes the rotor's magnetic frame that has been formed as a ring to surround the stator 32, and is made of magnetically conductive sheets, for example, by piling them as a sheet pack which is the length of the rotor. The rotor 34 is fitted with a bearing to the electric machine's frame in a known way.

According to the synchronous machine's number of poles, a number of permanent magnets 38, including the rotor's magnetic poles, have been fastened onto the inner circumference 36 of the rotor's magnetic frame. In the lengthwise direction of the synchronous machine, there are several separate permanent magnets 38 so that they substantially cover the length of the entire rotor. The permanent magnets 38 include the undersurface 40 which is placed against the washer 42 fitted on the inner surface of the rotor's magnetic frame. The lower surface of the washer 42 against the rotor is slightly curved, corresponding to the curvature of the inner circumference 36 of the rotor's magnetic frame. The washer 42 has a straight upper surface, and the permanent magnet is against the surface.

The permanent magnet's 38 top surface against the air gap δ and the stator 32 includes three parts, the middle part 44 and two side parts 46 and 48. The top surface's middle part 44 is substantially parallel to the permanent magnet's undersurface 40, such that the permanent magnet is of an even thickness at the middle part 44. In this case, the one pole permanent magnet 38 includes three pieces parallel in the circumferential direction of the electric machine, piece 41 in the middle and pieces 43 at the edges. The cross-section of piece 41 is a rectangle, and the cross-sections of pieces 43 are trapezoids. At the permanent magnet's middle part 44, the distance between the stator's inner surface and the permanent magnet, that is, the machine's air gap length D is substantially equal. Only the curvature of the stator's outer surface slightly changes the air gap at the permanent magnet's middle part 44, but its impact is minor in a multipole machine with a large diameter.

The permanent magnet's top surface's edge parts 46 and 48 have been slightly bevelled in the example in FIG. 2 so that the thickness of the permanent magnet at the edge is about a quarter smaller than in the middle part. The distance between the permanent magnet's edge part and the stator's outer surface is 2D, that is, two times the air gap at the middle part of the permanent magnet. The permanent magnet's middle part length in the circumferential direction of the machine can vary by machine.

The top surface towards the permanent magnet's stator and the air gap is coated with a protective layer 45, extending at least over the top surface's middle part and edge parts. The protective layer 45 can also cover the vertical surface 39 of the permanent magnet's edge. The protective layer 45 acts as mechanical reinforcement and mechanical protection, and corrosion protection for the relatively fragile permanent magnet 38. Moreover, the protective layer provides heat insulation, for preventing the permanent magnets from heating as a result of the heat from the stator. In this way, the operating temperature of the permanent magnets can remain within the rated values, in which case their efficiency is at their best. In addition, permanent magnets of a lower thermal class can be used, which can reduce the costs. A desired material of the protective layer 45 is non-magnetic and electrically non-conductive, for example, a suitable composite material.

Connecting devices 50 are fitted on both sides of the permanent magnets 38. The devices have connecting lugs 52, extending over the permanent magnets' edge parts 46 and 48. At their middle section 54, the connecting devices have been fastened with bolts 56 to the rotor frame. The fastening bolt 56 extends through the rotor frame. In the connecting device's middle part 54, a threaded hole has been formed and the fastening bolt 56 is screwed into the hole. The connecting device can be made of a non-magnetic material, for example, aluminum or steel, or a suitable composite material. The connecting device's 50 middle part is slightly narrower than the space remaining between the permanent magnets. Moreover, the connecting device's edge 58 is slightly slanted in regard to the permanent magnet's 38 vertical edge 39. In this case, a gap remains between the connecting lug and the vertical surface of the permanent magnet's edge, which makes for easier fitting and leaves the edge surface of the permanent magnet free. As the head of the fastening bolt 56 is outside the rotor, the connecting device's inner surface between the lugs remains free. This can improve the flow of cooling air between the permanent magnets.

Figure 3:
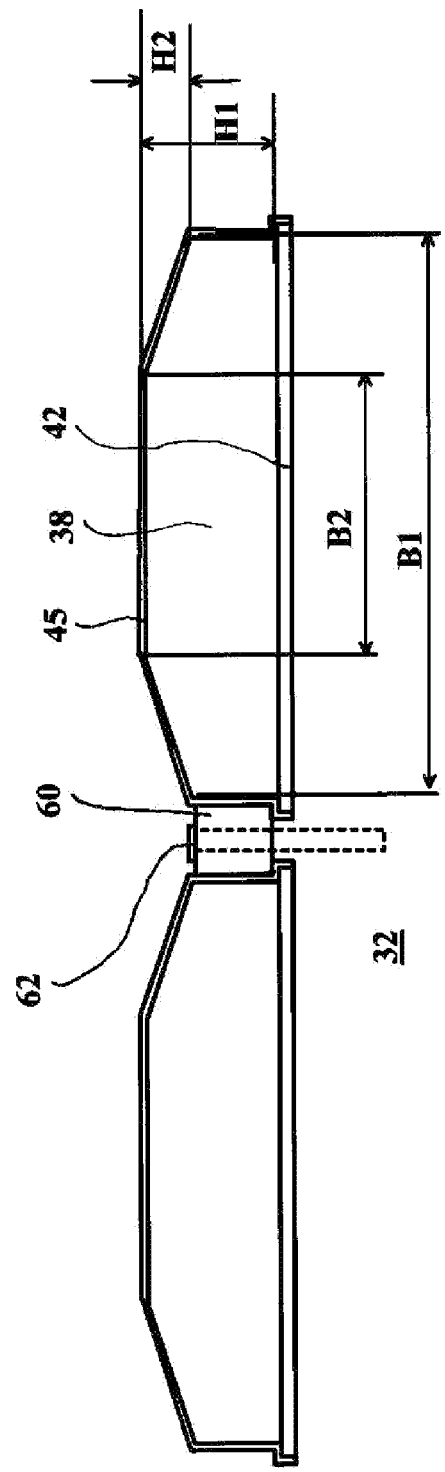
FIG. 3 is a partial illustration of a third electric machine according to an exemplary embodiment of the disclosure.

FIG. 3 illustrates the third example embodiment of the disclosure, and when applicable, the same reference numbers for the same parts as in FIGS. 1 and 2 have been used. The rotor's outer surface and the position of the permanent magnets have been illustrated as straightened in order to clarify the dimensions presented later on. The permanent magnet pieces have been formed so that their width is, for example, about 85% (e.g., ±10%) of the pole distribution, in which case the permanent magnet's width corresponds to approximately 150 electric degrees. The horizontal surface of the permanent magnet's top part is, for example, about 50% (e.g., ±10%) of the pole distribution, which corresponds to about 90 electric degrees.

FIG. 3 uses the reference marking B1 for indicating the permanent magnet's width in the circumferential direction of the rotor, and the reference marking B2 for indicating the width of the horizontal part of the permanent magnet's top part. Correspondingly, H1 refers to the height of the permanent magnet, and H2 refers to the depth of the permanent magnet's bevel at the permanent magnet's edge. As a function of these values, FIGS. 4 to 7 illustrate the cogging torque fluctuation during idling and correspondingly the torque ripple under load.

In the example in FIG. 3, the permanent magnets are fastened to the rotor core by the fastening beam 60 and the bolts 62 fitted to the beam. The permanent magnets 38 have been fastened to the washer 42, and the protective layer 45 has been fitted on them. The washer 42 is slightly broader than the permanent magnet 38, and the fastening beam 62 presses against it, fastening the permanent magnets to the rotor.

Figure 4:
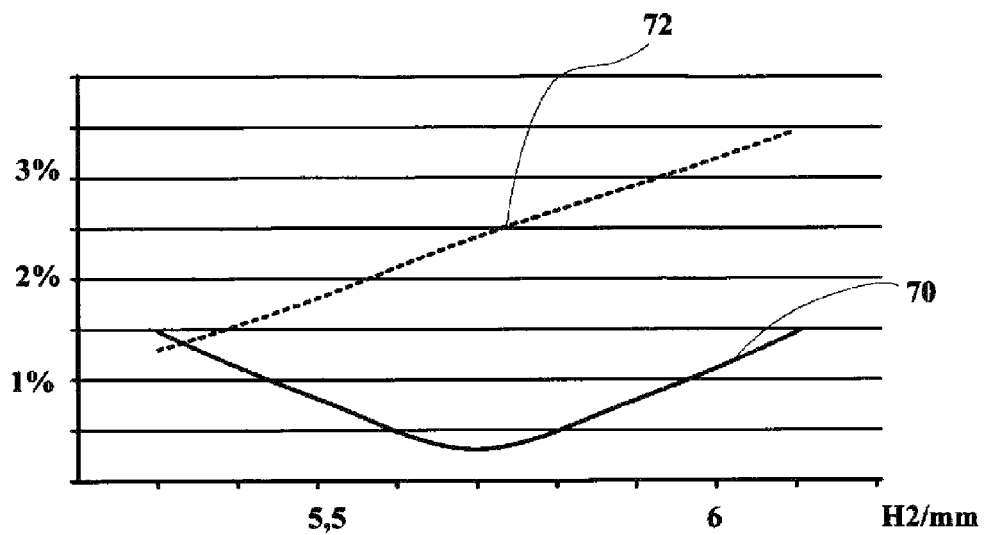
FIG. 4 illustrates exemplary cogging torque fluctuations and the torque ripple fluctuations as a function of the magnet's bevel.
Figure 5:
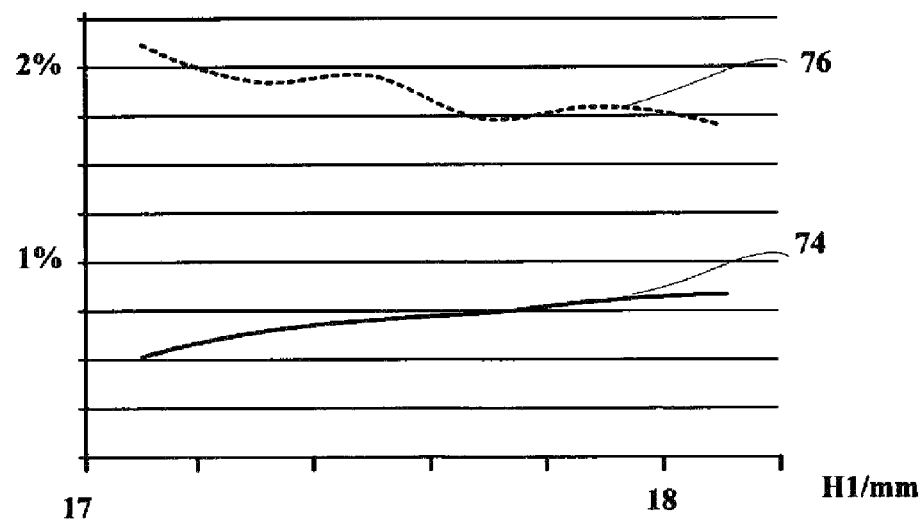
FIG. 5 illustrates exemplary cogging torque fluctuations and the torque ripple fluctuations as a function of the magnet's thickness.

Graph 70 in FIG. 4 illustrates exemplary cogging torque fluctuation during idling as a function of the bevel's depth H2, and graph 72 illustrates the torque ripple change when the electric machine is under load. The torques are peak-to-peak values and relative values, that is, percentages of the nominal torque. Graph 74 in FIG. 5 illustrates the cogging torque fluctuation during idling as a function of the permanent magnet's thickness H1, and graph 76 illustrates the torque ripple change when the electric machine is under load.

Figure 6:
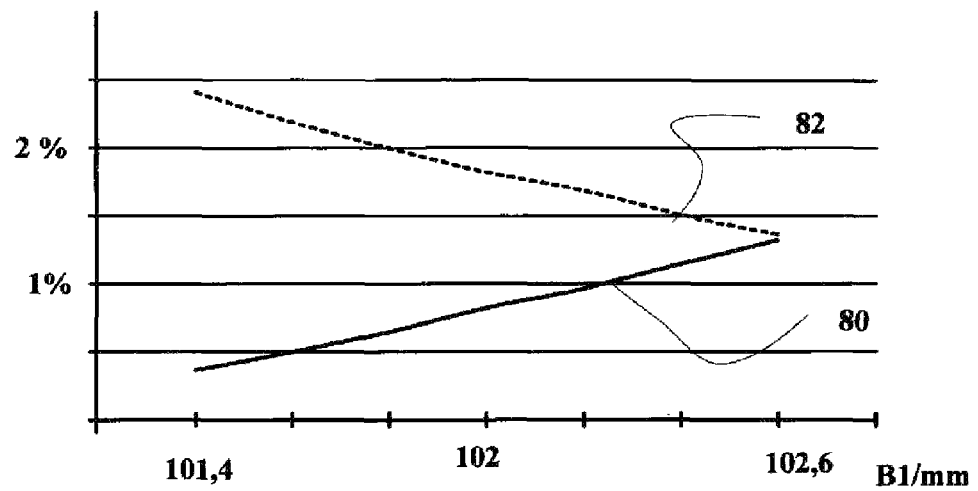
FIG. 6 illustrates exemplary cogging torque fluctuations and the torque ripple fluctuations as a function of the magnet's width.
Figure 7:
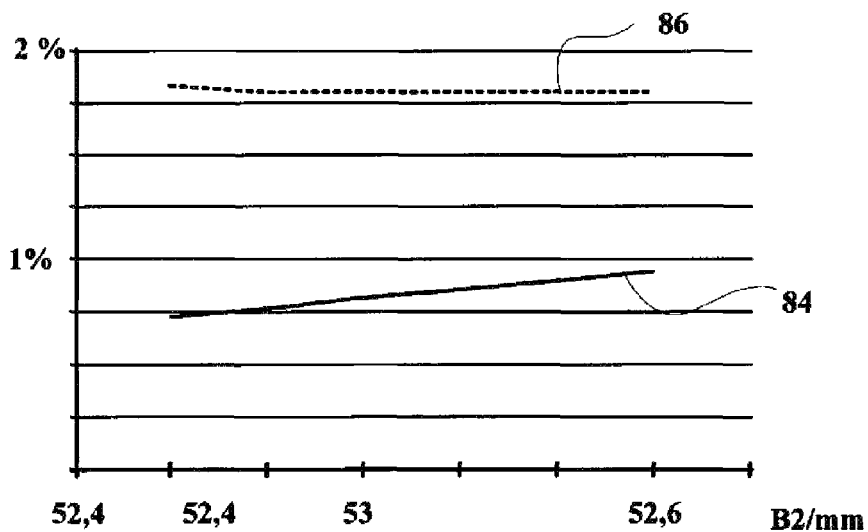
FIG. 7 illustrates exemplary cogging torque fluctuations and the torque ripple fluctuations as a function of the width of the magnet's middle area.

Correspondingly, graph 80 in FIG. 6 illustrates exemplary cogging torque fluctuation during idling as a function of the permanent magnet's width B1, and graph 82 illustrates the torque ripple change when the electric machine is under load. Graph 84 in FIG. 7 illustrates exemplary cogging torque fluctuation during idling as a function of the permanent magnet's even top part B2, and graph 86 illustrates the torque ripple change when the electric machine is under load.

In FIGS. 4 to 7, it can be seen that conditions for maintaining the cogging torque during idling and the torque ripple under load within specified (e.g., allowed) limits are partly conflicting, such that changing one dimension of the permanent magnet on the basis of one criterion results in a worse situation with regard to another criterion. According to the disclosure, cogging torque and torque ripple values can be calculated for a number of different dimensions, and then an alternative meeting both conditions will be chosen.

The embodiments presented in FIGS. 1, 2 and 3 illustrate some exemplary embodiments which can be used for implementing the idea of the disclosure. Several alternative solutions are possible, such as mutually replacing the corresponding parts in FIGS. 1 and 2. It should be recognized that both in case of an external and an internal rotor, the permanent magnet can be substantially fully identical both in dimensions and shape. The connecting lugs and their fastening bolts are also interreplaceable, and, for example, the fastening bolt going through the figure's rotor frame can be used in case of an internal rotor, when the rotor has a hollow structure. The permanent magnets' connecting devices may include separate devices corresponding to adjacent permanent magnets, or devices connecting many consecutive permanent magnet pairs in the direction of the shaft.

In the above, the disclosure has been described with the help of certain embodiments. However, the description should not be considered as limiting the scope of patent protection; the embodiments of the disclosure may vary within the scope of the following claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An electric machine comprising:
   a stator;
   a cylindrical permanent magnet rotor having a circumferential surface;
   a plurality of permanent magnets fitted onto the circumferential surface and opposite the stator;
   whereby the electric machine's air gap is the distance between a stator circumference and a top surface of the permanent magnet, wherein the permanent magnets form a rotor pole, each permanent magnet being shaped so that an air gap magnitude is essentially constant in the pole's middle area, and the air gap increases substantially linearly from the pole's middle area towards a pole edge, and the middle area's width in a circumferential direction of the rotor is at least half of a width of the magnet, and the air pap magnitude at the permanent magnet's edge is at most two times the air gap at the middle part of the pole.

2. The electric machine according to claim 1, comprising:
   a washer fitted between the permanent magnet and the circumferential surface of the rotor, and a lower surface of the washer corresponds with the rotor's circumferential surface, and a top surface of the washer is straight.

3. The electric machine according to claim 2, wherein the air gap magnitude at the permanent magnet's edge is at most two times the air gap at the middle part of the pole.

4. The electric machine according to claim 2, wherein the pole's middle area width in the circumferential direction is from 60 to 100 electric degrees.

5. The electric machine according to claim 2, wherein the electric machine's number of poles is over 10.

6. The electric machine according to claim 1, wherein the pole's middle area width in the circumferential direction is from 60 to 100 electric degrees.

7. The electric machine according to claim 6, wherein the pole's middle area width in the circumferential direction of the tangent is from 70 to 90 electric degrees.

8. The electric machine according to claim 6, wherein the electric machine's number of poles is over 10.

9. The electric machine according to claim 1, wherein the electric machine's number of poles is over 10.

10. An electric machine according to claim 1, wherein in the electric machine's number of slots per pole per phase is one or two.

11. An electric machine according to claim 1, wherein the electric machine has a radial air gap and an external rotor.

12. An electric machine according to claim 1, wherein the electric machine has a radial air gap and an internal rotor.

13. A permanent magnet for an electric machine, the electric machine including a stator and a rotor having an outer circumference, the permanent magnet comprising:
   an inner surface that can be arranged on the rotor's outer circumference, and an outer surface that is facing towards the electric machine's stator to form an air gap, wherein: the permanent magnet includes edge parts and a middle part, the permanent magnet has an even thickness in the middle part, the permanent magnet's thickness evenly decreases towards the permanent magnet's edge, and the middle part's width is equal to or larger than the combined width of the edge parts, wherein the air gap magnitude at the permanent magnet's edge is at most two times the air gap at the middle part.

14. A permanent magnet according to claim 13, comprising:
   a protective layer coating at least the outer surface of the permanent magnet.

15. A permanent magnet according to claim 14, comprising:
   connecting devices for fitting to the permanent magnet, the connecting devices corresponding to the magnet's edge parts, and for fastening the permanent magnet to an electric machine.

16. A permanent magnet according to claim 13, comprising:
   connecting devices for fitting to the permanent magnet, the connecting devices corresponding to the magnet's edge parts and for fastening the permanent magnet to an electric machine.

17. A method for decreasing a surface fitted permanent magnet electric machine's slot harmonics torque, to which machine has been specified a nominal torque, and at least a rotor pole's permanent magnet width, a thickness of the permanent magnet and a size of the electric machine's air gap, the permanent magnet including an outer surface facing towards the machine's air gap, and an inner part facing against a rotor frame, whereby the outer surface's middle part is at an air gap's distance from a stator and edges of the outer surface are beveled so that the air gap magnitude at the permanent magnet's edges is at most two times the air gap at the middle part, wherein the method comprises:
   forming a number of alternative permanent magnet dimensions by varying at least one permanent magnet dimension from among the following: the permanent magnet's width; the permanent magnet's thickness; the permanent magnet's middle part width; and a bevel depth of the permanent magnet at the edge of the permanent magnet;
   calculating a cogging torque's torque ripple magnitude for the formed dimensions of the permanent magnet;
   selecting a dimension by which the cogging torque and torque ripple are under a specified value; and
   manufacturing and installing the permanent magnet according to the selected dimension to the electric machine.

* * * * *